United States Patent [19]

Tanigawa et al.

[11] 3,930,270

[45] Dec. 30, 1975

[54] TAPE GUIDING DRUMS OF THE MAGNETIC RECORDING AND REPRODUCING APPARATUS

[75] Inventors: Shizuhiko Tanigawa, Moriguchi; Satoshi Kikuya, Kadoma; Yoshinori Yamazoe, Osaka; Chihiro Nakamura, Moriguchi, all of Japan

[73] Assignee: Matsushita Electric Industrial Co., Ltd., Osaka, Japan

[22] Filed: July 8, 1974

[21] Appl. No.: 486,453

[30] Foreign Application Priority Data

July 12, 1973 Japan .......................... 48-83014[U]
July 12, 1973 Japan .......................... 48-83015[U]

[52] U.S. Cl. .................. 360/130; 360/84; 360/102; 360/107

[51] Int. Cl.$^2$ ...................... G11B 15/60; G11B 5/52; G11B 21/28

[58] Field of Search ............ 360/130, 107, 84, 102, 360/103, 128

[56] References Cited

UNITED STATES PATENTS 3,778,560 12/1973 Precin et al. ........................ 360/107
3,840,895 10/1974 Kubo ................................ 360/107

*Primary Examiner*—Alfred H. Eddleman
*Attorney, Agent, or Firm*—Wenderoth, Lind & Ponack

[57] ABSTRACT

A tape guiding drum for a magnetic recording and reproducing apparatus including a rotary magnetic head, a lower drum having a cylindrical tape guide surface formed on the upper peripheral portion thereon, and an upper drum having a cylindrical tape guide surface on the lower peripheral portion thereof and disposed above the lower drum so as to leave a slit between the drums, the rotary magnetic head being provided within the slit and the tape being obliquely run around the drums, straddling the slit. At least one of the two drums has a notched portion along the side edge of the drum along the slit whereby a uniform reproducing output envelope can be obtained with the rotary head within the effective scanning zone of the rotary head.

5 Claims, 7 Drawing Figures

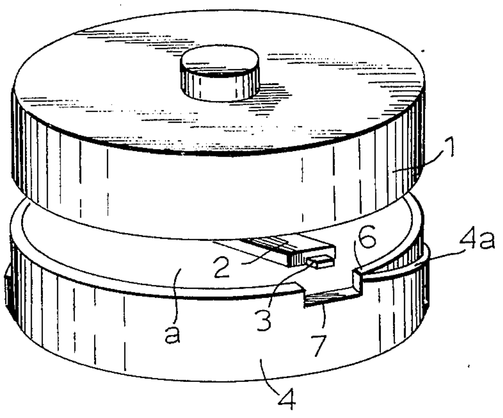
FIG. 1
FIG. 2
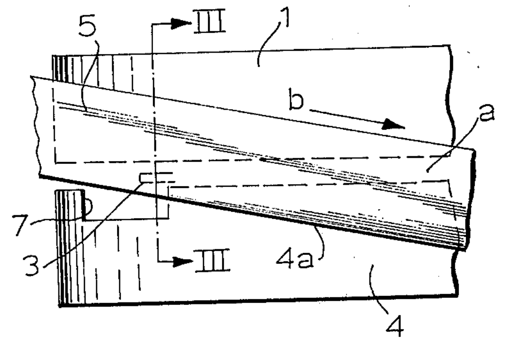
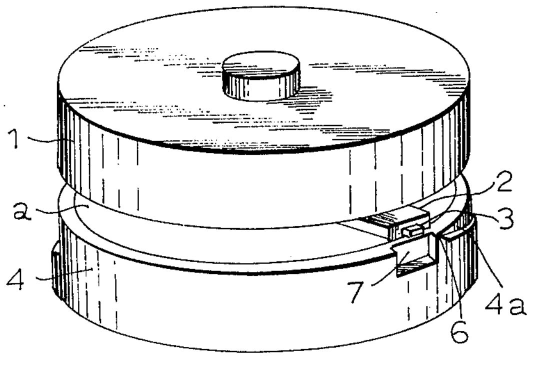
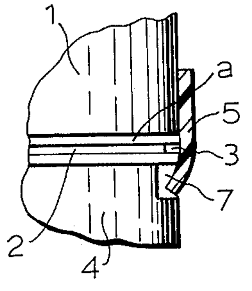
FIG. 3
FIG. 4

TAPE GUIDING DRUMS OF THE MAGNETIC RECORDING AND REPRODUCING APPARATUS

BACKGROUND OF THE INVENTION

1. Field of the Invention

This invention relates to tape guiding drums, and more particularly pertains to the tape guide drums of magnetic recording and reproducing apparatus of the rotary head type which obliquely scans the magnetic tape.

2. Description of the Prior Art

The reproducing output envelope of a rotary head (hereinafter designated simply as the envelope) should be uniform within the effective scanning zone of the rotary head. Heretofore, the degradation in the envelope around the switching points of two heads, i.e., where the tape comes onto or off the drums, has been a problem. This is attributable to the deterioration in the condition of the contact between the head and the tape (hereinafter designated head-contact) at the beginning and end of the contact of the tape with the drum. As a countermeasure, it has been contemplated to increase the width of the slit between the upper and lower drums, so that the tape edges will fall into the slit at the beginning and end of the contact of the tape, thereby achieving a strond head-contact.

In widening the slit, however, another problem has arisen in allowing the tape to enter the slit.

SUMMARY OF THE INVENTION

Objects of the Invention

The present invention makes it possible to eliminate the conventional defects described above.

Therefore, it is an object of this invention to provide a tape guiding drum for a magnetic recording and reproducing apparatus in which the reproducing output envelopes of the rotary heads are uniform within the effective scanning zone of each rotary head.

It is another object of this invention to provide the guide drums which guide the tape smoothly and keep the tape securely in contact with the rotary head.

These objects are achieved according to the present invention by a tape guiding drum means for a magnetic recording and reproducing apparatus including a lower drum having a cylindrical tape guide surface formed on the upper peripheral portion thereof, an upper drum having a cylindrical tape guide surface formed on the lower peripheral portion and disposed above the lower drum so as to leave a slit between the drums and a rotary magnetic head within the slit, whereby, the tape can be run obliquely over the peripheral surfaces of the drums, straddling the slit. At least one of the two drums has a notched portion along the edge of the drum which is toward the slit.

The notched portion can be provided at least at one of the points of the beginning and end of the tape contact with the drum means or at both the beginning and end points of tape contact.

Alternatively, at least one of the two drums can have a reduced diameter portion along the edge of the drum which is toward the slit with a diameter smaller than the diameter of the cylindrical tape guide surface. The edge of the drum can be beveled, or can have rectangular notch therein.

BRIEF DESCRIPTION OF THE DRAWINGS

Other objects and advantageous features of this invention will become apparent from the following detailed description of some embodiments thereof, taken together with the accompanying drawings, in which;

FIG. 1 is a perspective view showing a part of the peripheral surfaces of the drums of a magnetic recording and reproducing apparatus according to this invention;

FIG. 2 is a side view showing the running condition of the tape;

FIG. 3 is a partial sectional view, on an enlarged scale, taken along lines III–III' of FIG. 2;

FIG. 4 is a perspective view showing a part of the drums of another embodiment of this invention;

DETAILED DESCRIPTION OF THIS INVENTION

Figure 5:
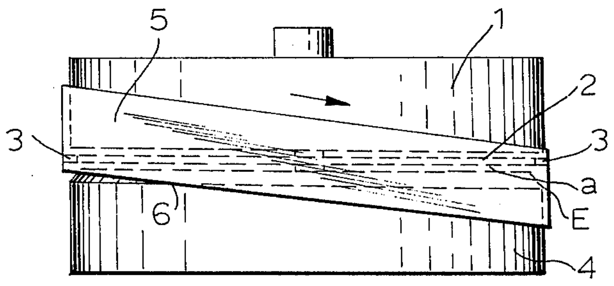
FIG. 5 is a side view of the drums of another embodiment of this invention.

FIGS. 1, 2 and 3 show only the drum means of a magnetic recording and reproducing apparatus according to this invention.

Referring to FIGS. 1, 2 and 3, there is shown an upper drum 1 for guiding the tape, a head-bar 2 having a magnetic head 3 mounted on the end thereof. A lower drum 4 is positioned beneath drum 1 a distance such that a slit *a* is formed between it and the lower end of the upper drum 1. A magnetic tape 5 runs obliquely on the drums 1 and 4, the drum 4 having a stepped part 4a thereon for guiding the tape 5. The point at which the tape 5 falls into the slit *a*, when the magnetic tape 5 is running, is at 6. A notched part 7 is formed at point 6 by removing a part of the edge of the lower drum 4 which is toward the slit *a* for facilitating the falling of the tape 5 into the slit *a*.

With the aforementioned construction, as the tape 5 runs in the direction indicated by the arrow, the edge of the tape 5 falls into the notched part 7 at the beginning of the tape contact with the drums 1 and 4. Accordingly, the contact force between the tape 5 and the magnetic head 3 is not only increased, but a positive contact is assured as well. If another notched part is formed at the point at the end of the tape contact with the drums for the tape 5, the above descibed improved head-contact will be further ensured. In this instance, the additional notched part is provided in the upper drum; thus, one of the notched parts is provided on each of the drums 1 and 4.

Because at points other than the notched part 7 the slit has a conventional small slit width as is usual, the take-in of the tape 5 does not take place, and moreover, little care is required in forming the notched part 7.

FIG. 4 shows such a notched part 7 formed by removing a part of the lower drum 4 to a degree which is insufficient to pierce it.

Figure 6:
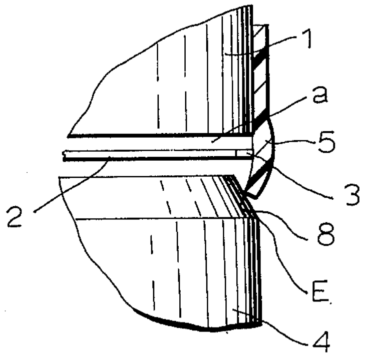
FIG. 6 is a partial section, on an enlarged scale of an essential part of the drums of FIG. 5.

FIGS. 5 and 6 show another embodiment of this invention.

Referring to FIGS. 5 and 6, a reduced diameter part 8 can be formed on the lower drum 4 by beveling the edge on the side toward the slit *a;* the diameter adjacent the slit is thus smaller than that of the drum 1.

Figure 7:
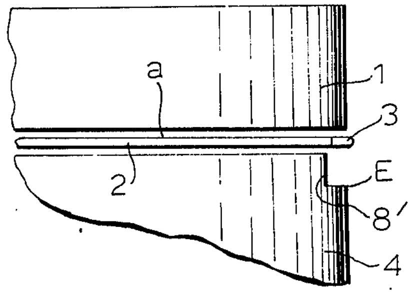
FIG. 7 is a partial side view, on an enlarged scale, showing another embodiment of this invention.

With the above described construction, the lower edge of the tape 5 is not fully supported on the lower drum 4 and the tape 6 assumes the posture in which the lower curls into the slit *a*, as shown in FIG. 6. Thus, the magnetic head 3 makes good contact with the tape 5. Because it is possible to provide the reduced diameter part merely by notching the drum, without requiring the width of slit *a* to be altered, it is easy to manufacture, and the take-in of the tape 5 into the slit *a* is foreclosed, FIG. 7 shows a reduced diameter part 8' formed by notching the entire periphery of the drum with a rectangular notch. In this way, an effect comparable to that obtained by the beveling as shown in FIGS. 5 and 6 can be achieved, but because edge portion E is sharp in comparison with that of the embodiment of FIGS. 5 and 6, the tape is liable to be damaged somewhat.

In the embodiments of FIGS. 5, 6 and 7, the beveled or reduced diameter part 8 or 8' is formed on the lower drum 4, but an equivalent effect to that of this embodiment can be achieved by providing the reduced diameter part 8 or 8' on the upper drum 1, or by providing it on both drums 1 and 4.

As described in the foregoing, the tape guiding drums of the magnetic recording and reproducing apparatus of this invention are arranged above and below the slit in which the magnetic head travels, and over which the magnetic tape is run, straddling the aforementioned slit, with a notched portion or an annular surface with a diameter smaller than the diameter of the surface on which the tape is run formed on at least one of the edges of the aforementioned two drums which is toward the slit. Such a construction has the effect not only of assuring positive contact between the magnetic head and the magnetic tape, but also of preventing the tape from being taken into the slit, and other such effects.

What is claimed is:

1. A tape guiding drum means for a magnetic recording and reproducing apparatus including;

a lower drum having a cylindrical tape guide surface formed on the upper peripheral portion thereof;

an upper drum having a cylindrical tape guide surface formed on the lower peripheral portion and disposed above the lower drum so as to leave a slit between the drums; and a rotary magnetic head within the slit, whereby the tape can be run obliquely over the peripheral surface of the drums, straddling the slit;

at least one of the two drums having a notched portion along the edge of the drum which, during operation of the apparatus, is open toward the slit, said notched portion being provided at least at one of the points of the beginning and end of the tape contact with the drum means.

2. A tape guiding drum means according to claim 1, wherein the notched portion is provided in one of the drums at both the beginning and end points of tape contact.

3. A tape guiding drum means for a magnetic recording and reproducing apparatus including;

a lower drum having a cylindrical tape guide surface formed on the upper peripheral portion thereof; and an upper drum having a cylindrical tape guide surface formed on the lower peripheral portion and disposed above the lower drum so as to leave a slit between the drums;

a rotary magnetic head within the slit, whereby tape can be run obliquely over the peripheral surfaces of the drums, straddling the slit;

at least one of the two drums having a reduced diameter portion along the edge of the drum which is toward the slit with a diameter smaller than the diameter of the cylindrical tape guide surface.

4. A tape guiding drum means according to claim 3, wherein the edge of the drum is beveled.

5. A tape guiding drum means according to claim 3, wherein the edge of the drum has a rectangular notch therein.

* * * * *